(No Model.)   5 Sheets—Sheet 1.

F. EGGE.
MACHINE FOR SETTING LACING HOOKS.

No. 480,185.   Patented Aug. 2, 1892.

WITNESSES:
J. F. Finch.
J. S. Williamson.

INVENTOR
F. Egge
BY F. W. Smith Jr.
ATTORNEY (No Model.) 5 Sheets—Sheet 2.
F. EGGE.
MACHINE FOR SETTING LACING HOOKS.

No. 480,185. Patented Aug. 2, 1892.

WITNESSES:
J. F. Finch.
L. S. Williamson.

INVENTOR
F. Egge
BY F. W. Smith Jr.
ATTORNEY (No Model.) 5 Sheets—Sheet 3.

F. EGGE.
MACHINE FOR SETTING LACING HOOKS.

No. 480,185. Patented Aug. 2, 1892.

WITNESSES:
J. F. Finch.
S. S. Williamson.

INVENTOR
F. Egge
BY F. W. Smith Jr.
ATTORNEY (No Model.) 5 Sheets—Sheet 4.
F. EGGE.
MACHINE FOR SETTING LACING HOOKS.
No. 480,185. Patented Aug. 2, 1892.
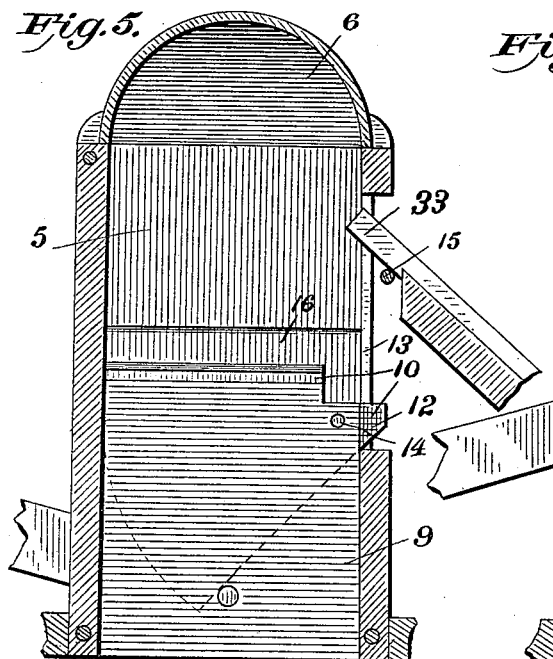
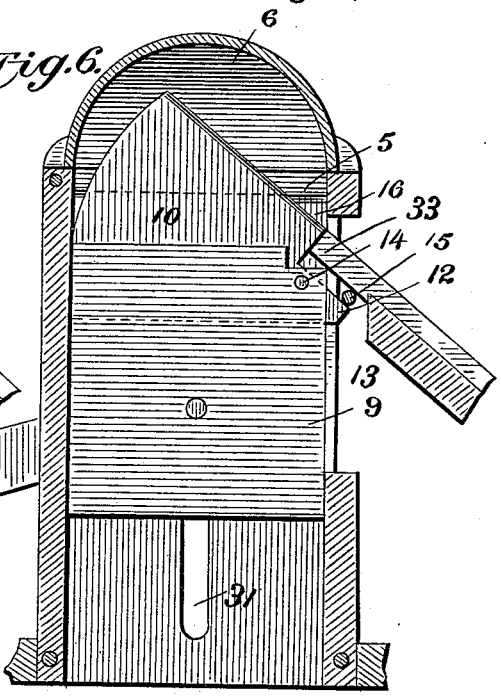
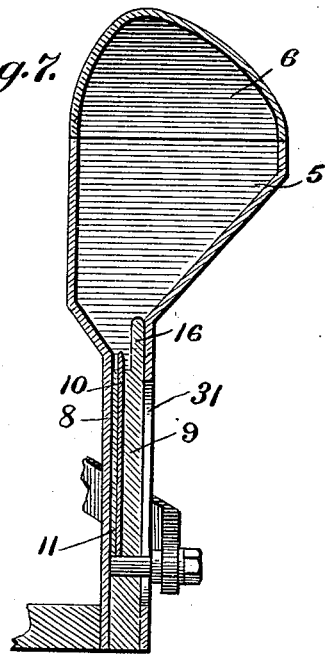
WITNESSES:
INVENTOR
F. Egge
BY
F. W. Smith Jr.
ATTORNEY (No Model.) 5 Sheets—Sheet 5.

F. EGGE.
MACHINE FOR SETTING LACING HOOKS.

No. 480,185. Patented Aug. 2, 1892.

WITNESSES:
J. F. Finch.
S. S. Williamson.

INVENTOR
F. Egge
BY T. W. Smith Jr.
ATTORNEY

UNITED STATES PATENT OFFICE.

FREDERICK EGGE, OF BRIDGEPORT, CONNECTICUT.

MACHINE FOR SETTING LACING-HOOKS.

SPECIFICATION forming part of Letters Patent No. 480,185, dated August 2, 1892.

Application filed July 30, 1891. Serial No. 401,201. (No model.)

*To all whom it may concern:*

Be it known that I, FREDERICK EGGE, a citizen of the United States, residing at Bridgeport, in the county of Fairfield and State of Connecticut, have invented certain new and useful Improvements in Machines for Setting Lacing-Hooks; and I do hereby declare the following to be a full, clear, and exact description of the invention, such as will enable others skilled in the art to which it appertains to make and use the same.

My invention relates to machines for setting lacing-hooks to any desired material, as shoe-uppers and the like, but especially refers to that class of such machines which is provided with automatic means for selecting the hooks from a mass of hooks in a hopper and guiding and delivering them to the setting devices.

Figure 1:
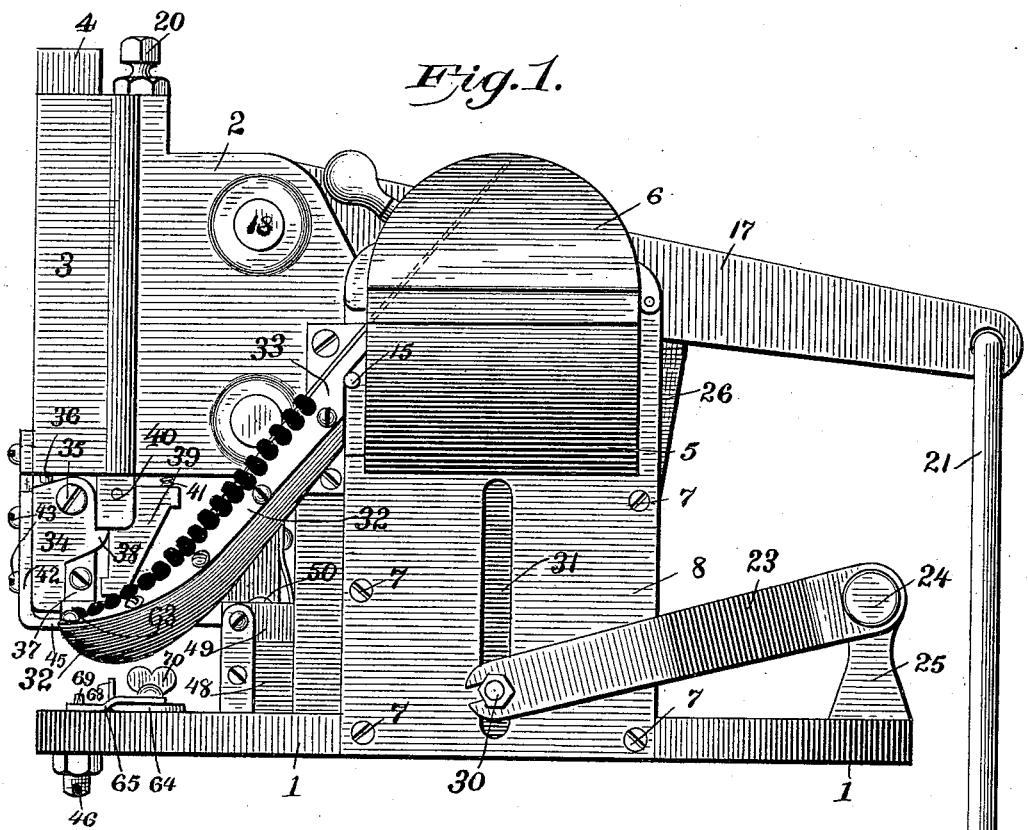
Figure 13:
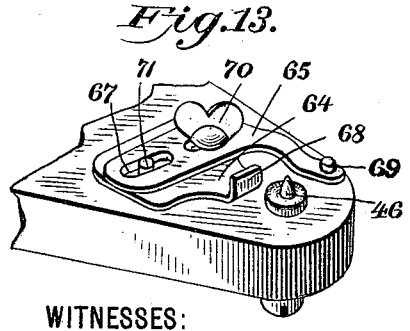
Figure 14:
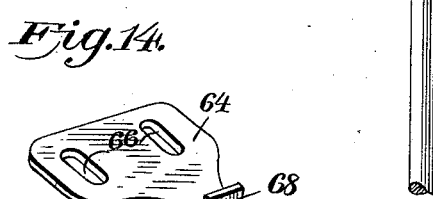
Figure 2:
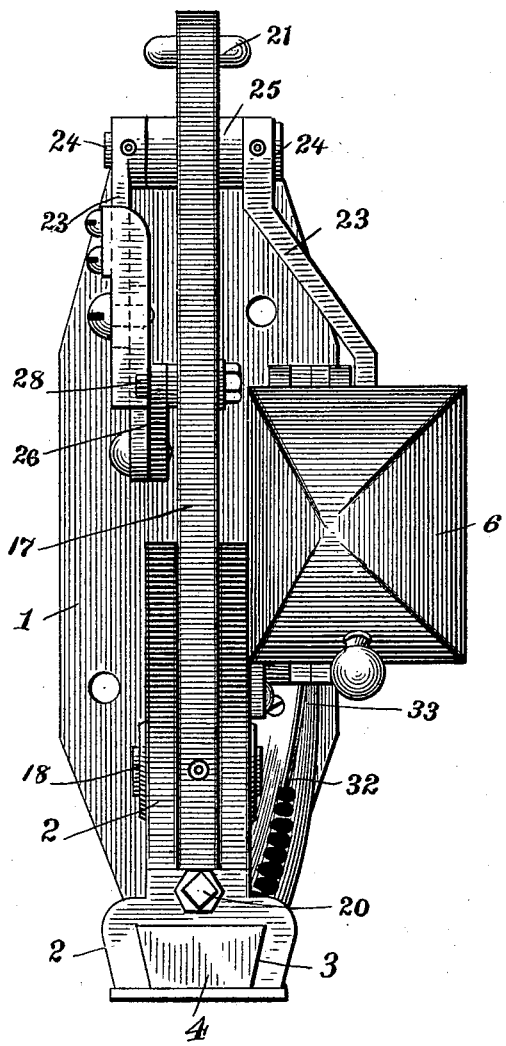
Figure 3:
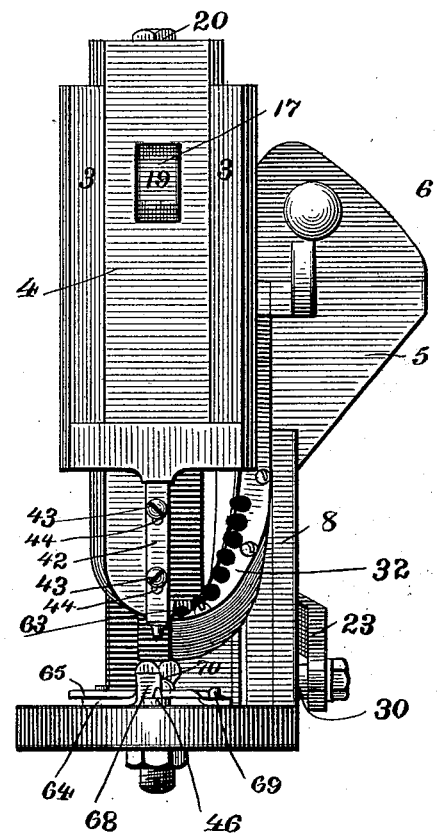
Figure 4:
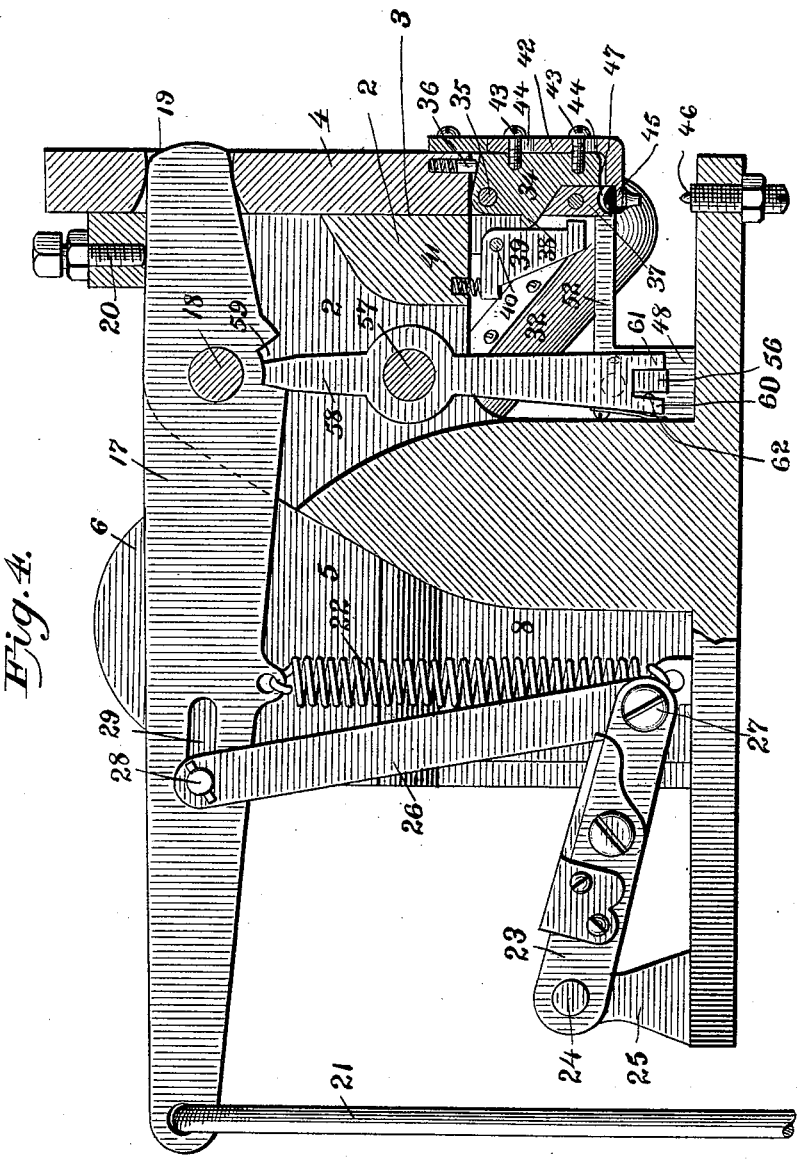
Figure 8:
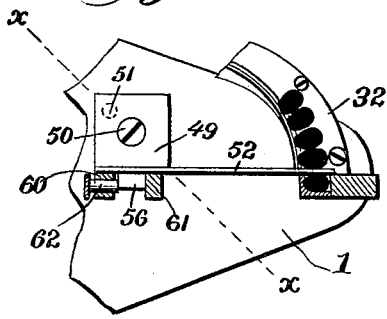
Figure 9:
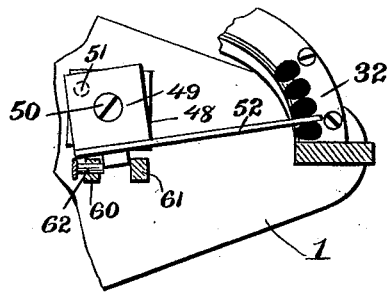
Figure 10:
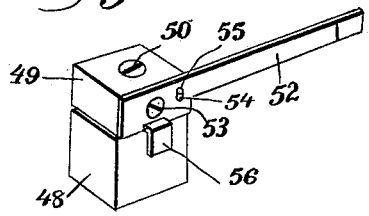
Figure 11:
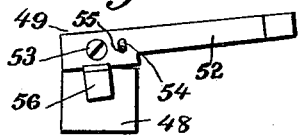
Figure 12:
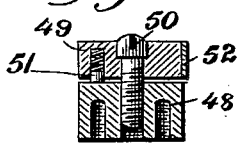

In the accompanying drawings, Figure 1 is a side elevation of my improved machine; Fig. 2, a plan view; Fig. 3, a front elevation; Fig. 4, a sectional elevation; Fig. 5, a detail transverse sectional elevation of the hopper and parts contained therein with the hook-selecting devices in normal position; Fig. 6, a view similar to Fig. 5, but showing the hook-selecting devices in elevated position; Fig. 7, a cross-section through the hopper; Figs. 8 and 9, detail broken sectional views showing the operation of the hook selecting and delivering lever; Fig. 10, a detail perspective of the hook selecting and delivering lever and the operative parts connected thereto; Fig. 11, a side elevation of said lever in elevated position, and Fig. 12 a section at the line $x\ x$ of Fig. 8. Figs. 13 and 14 illustrate details.

Similar numbers of reference denote like parts in the several figures.

I have shown my improvement in connection with a foot-press; but it will be obvious that the press-gate and the parts carried and actuated thereby may be operated by means of the usual eccentric of a power-press, and I therefore do not wish to be limited to any especial means employed for effecting the reciprocation of said gate.

In several respects the present invention is an improvement on the construction shown and described in my pending application, Serial No. 337,653, filed January 13, 1891, the object of the present improvement being to provide a more compact, simpler, and cheaper machine than that referred to in said pending application.

The principal feature of the present invention resides in the novel instrumentalities employed for selecting the hooks from a mass of the same and delivering them successively to the setting devices, which latter do not differ materially from those shown and described in my aforesaid pending application.

I will now describe my invention, reference by numbers being had to the accompanying drawings.

1 is the bed of the press, and 2 the head thereof, provided with ways 3, within which the press-gate 4 is assembled, so as to be capable of a vertical reciprocation.

5 is the hopper of any desired shape and having a cover 6 hinged thereto. The hopper is secured to the bed 1 by any suitable means, as screws 7, and the lower portion of said hopper is contracted to form an elongated foot 8, as shown in Fig. 7. Within this foot are normally assembled the devices for selecting the hooks from the mass thereof in the hopper and delivering them within a chute which leads to the setting devices. 9 is a plate in this foot, which conforms closely to the interior of said foot, but is capable of a free vertical reciprocation therein.

10 is a blade within a deep slot 11 in the plate 9, said blade being of a general triangular shape, as shown partly in solid and dotted lines in Figs. 5 and 6. This blade has a shoulder 12, which extends without the hopper through an elongated slot 13 in the latter, and said blade is pivoted at 14 to the plate 9. The edge of the blade in normal position projects above the plate 9 and is in a horizontal plane, as shown at Fig. 5; but when the plate 9 is elevated the shoulder 12 will strike the pin 15, extending from the head 2, thereby swinging or tilting the blade on its pivot to the position shown in Fig. 6.

16 is a guard-lip extending upward from the upper edge of the plate 9 in the rear of the blade and separated from the latter by a space which will readily admit the heads of the hooks, but is not wide enough to contain the shanks of said hooks. As the plate rises through the mass of hooks this lip 16 will prevent the blade from picking up hooks except with their heads extending in one direction, and will also push aside hooks which would otherwise clog the field of the blade by reason of not being in a position advantageous for picking up.

I will now describe the instrumentalities which I have shown for effecting the operations of the press-gate and plate 9.

17 is a press-bar pivoted at 18 to the head 2 and loosely connected at 19 in the ordinary way to the press-gate.

20 is an adjustable stop to limit the upward movement of said bar. The heel end of said bar is connected to any suitable treadle device (not shown) by a rod 21, whereby the bar is operated by foot-power.

22 is a spring whose ends are connected to the bar 17 and bed 1, whereby said bar is returned to its normal position with the press-gate elevated.

23 is a yoke-frame pivoted at its heel end around a pin 24, supported by uprights 25, rising from the bed 1.

26 is a link, whose ends are pivoted, respectively, at 27 to one of the terminals of the yoke and at 28 within a slot 29 in the bar 17, whereby a reciprocatory movement is transmitted from said bar to said yoke. The other terminal of the yoke is loosely connected to the stud 30, which extends from the plate 9 through a vertical slot 31 in the side of the foot 8, whereby a vertical reciprocatory motion is transmitted from the yoke to said plate.

32 is a feed-chute secured to the head of the machine and having a guide-ledge 33, which extends through the upper extremity of the slot 13 into the hopper. That part of said ledge which extends within the hopper is in a vertical plane identical with that of the blade 10, and the pitch of the upper edge of the latter in its elevated tilted position coincides with the pitch of the ledge, and in such position the blade abuts against the ledge, so that said blade and ledge present a continuous and unbroken incline, as clearly seen at Fig. 6. Therefore it will be readily understood that said blade will deliver the hooks onto said ledge. The chute leads downward to the setting devices and is of a sinuous shape, the ledge at the bottom of said chute being in a horizontal plane, whereby the hooks may be readily delivered to the setting devices. The setting devices are mainly the same as are shown and described in my aforesaid pending application, the only difference being that I have in my present invention given the setting-toe a slight play in order to facilitate the delivery to and withdrawal from said toe of the hooks.

34 is the setting-head, pivoted at 35 within the foot of the gate 4; 36, a spring-bolt bearing against the upper edge of said head to normally keep the same in the position shown at Fig. 4; 37, a reinforce-block secured to the foot of the gate and having its bottom conformed to the shape of the hook-head; 38, a lug extending inwardly from the head 34 beyond the pivotal point 35; 39, a dog pivoted at 40 to the head 2, and 41 a spring, which acts against said dog to keep the latter normally projected immediately beneath the lug 38, all constructed and operating as in my aforesaid pending application.

42 is a face-plate secured to the outer face of the head 34 by screws 43, passed through slots 44 in said plate into said head. These screws secure the face-plate closely to the setting-head, but at the same time permit of the vertical movement of said plate within the limits prescribed by the slots 44. The lower end of this plate extends inward, and has on its extremity the setting-toe 45, which latter is immediately below the block 37. When the parts are in the position shown at Fig. 4, the toe will be in its lowest position and ample space will accordingly be left between the block and toe, so that if the heads of the hooks are not uniform there can be no wedging of the latter. After a hook has been delivered upon the toe and the press-gate operated to set the hook the toe will be driven upward by the impact of the hook against the setting-stud 46, thereby causing the block 37 to reinforce the toe in the performance of the setting operation. If desired, the movement of the toe may be made resilient by means of a spring in any well-known or ordinary manner. The lower end of the chute 32 leads within the recess 47 beneath the reinforce-block, and the ledge 33 is in alignment with and in close proximity to the toe 45, and I employ certain automatically-operated devices for selecting successively the lowermost hooks in the chute and delivering them onto the setting-toe, which devices I will now describe.

48 is a block secured to the bed 1, and 49 also a block pivoted at 50 to the first-mentioned block.

51 is a spring-actuated pin (see Fig. 12) depending from the block 49 and bearing against the block 48, the function of which pin is to prevent the too ready turning of said block 49 around its pivotal point 50. This spring-pin may, however, be omitted and any ordinary expedient well known to skilled labor resorted to for the purpose of checking the ready movement of said block, and I do not wish to be limited in this respect.

52 is a lever pivoted at 53 to the side of the block 49 and having a slot 54, through which projects a pin 55 from the said block, whereby said lever may have a slight vertical play within certain limits. Depending from said lever below the pivotal point thereof is a laterally-extending dog 56.

Pivoted at 57 to the head 2 is what I term a "vibrator-lever" 58, whose upper end projects within a recess 59 in the under side of the press-bar 17, so that when said bar is operated the end walls of said recess will alternately strike the lever and vibrate the same, as clearly shown at Fig. 4. The lower end of this lever has forks 60 61, between which the dog 56 extends in assembled position. A resilient pin 62, passing through one of the forks, bears against the dog to allow to the latter a slight play, as will be presently explained. As the press-gate descends the lower end of the lever 58 will be thrown forward, thereby initially elevating the lever 52, as shown at Fig. 11. As the lever 58 continues to advance the further elevation of the lever 52 will be prevented by the co-operation of the pin 55 and slot 54, and the spring-pin 51, which has hitherto successfully resisted the action of said lever 58, now yields and the block 49 is turned, thereby carrying the lever 52 to one side. In order that the operation and office of this lever 52 may be more clearly understood, I would call particular attention to Figs. 4, 8, 9, 10, 11, and 12. When this lever 52 is initially elevated, it is above the plane of the lowermost hook 63 in the chute, and as said lever is carried to one side by the aforesaid advancement of the vibrator 58 it will be brought into a vertical plane in the immediate rear of said hook. This is the position of the lever at the end of the downward stroke of the press-gate. On the upward movement of said gate the vibrator 58 will initially depress the lever 52 and force the same behind the hook 63, as shown at Fig. 9, and as said vibrator retreats on the continued upward movement of the gate, the block 49 will be swung back to normal position and the said hook will be driven within the recess 47 and onto the toe 45, as shown at Figs. 8 and 4. In most instances holes are punched wherein the hooks are to be set; but my improvement is capable of setting the hooks without punching holes therefor, and I have therefore shown a spacing-guide, whereby the hooks may be accurately and uniformly located both as to the space between the same and the distance from the hooks to the edge of the goods to which said hooks are set. This guide consists of two plates 64 65, having slots 66 67 extending in opposite directions. The plate 64 has formed therewith a lip 68, against which the edge of the goods is guided, while the plate 65 has projecting upwardly therefrom the stud 69, which enters the stump of the shank of the hook last set. 70 is a set-screw extending through one pair of these slots 66 67, and by means of which the plates 64 65 are held in any required position, while a pin 71 projects from the bed 1 through the other pair of such slots, thereby preventing any turning of said plates around the set-screw.

I claim—

1. The combination of the plate capable of a vertical reciprocation within the hopper, the blade pivoted within said plate and having its edge normally in a horizontal plane, the guard-lip projecting from the upper edge of said plate above the plane of the edge of the blade and separated from the latter by a space sufficient to admit the heads of the hooks, but too narrow to admit the shanks of the latter, means for moving said plate and blade together through the mass of hooks, and means for elevating said blade independent of the plate to deposit the hooks on the chute, substantially as set forth.

2. The combination of the hopper, the plate adapted to be vertically reciprocated therein and having an upward-projecting guard-lip, the blade pivoted within said plate, the upper edge of said blade extending normally in a plane below that of said lip, while the blade itself is separated from the lip by a space sufficient only to accommodate the heads of the hooks, the chute which leads to the setting devices, means for elevating said plate and blade together through the mass of hooks, and means for tilting said blade independent of the plate at the end of its upper movement into proper alignment with said chute, substantially as set forth.

3. In a machine of the character described, the combination of the vertically reciprocating press-gate, the pivoted press-bar loosely connected to said gate and having a recess in its under side, the pivoted block capable of a horizontal movement, the hook selecting and delivering lever pivoted to said block and capable of a vertical movement within prescribed limits, and the pivoted lever whose upper end extends within said recess and whose lower end is connected to the hook selecting-lever, substantially as set forth.

4. The combination of the chute, whose lower end leads to the setting devices, the lever pivoted to a horizontally-swinging block and capable of a vertical movement, said lever extending transversely above said chute, and means for operating said lever, whereby the same is raised above the lowermost hook, swung to a plane in the rear thereof, depressed immediately behind said hook, and finally thrown forward, thereby delivering said hook to the setting devices, substantially as set forth.

5. The combination of the reinforce-block secured to the press-gate, the setting-head pivoted to the latter, the spring-bolt normally maintaining the position of said head, and the face-plate secured to said head and capable of a vertical play and having integral therewith the setting-toe, which latter extends immediately beneath said block, substantially as shown and described.

6. In a machine for setting lacing-hooks, the herein-described device for selecting and lifting said hooks, with their heads extending in one direction, from a mass of such hooks within a hopper, said device comprising a blade pivoted to a plate, and a guard-lip projecting from said plate above the plane of the edge of the blade and separated from the latter by a space sufficient to admit the heads of the hooks, but too narrow to admit the shanks of the latter, in combination with means for reciprocating said plate and blade together vertically through the mass of hooks and means for tilting said blade on its pivotal point independent of the plate at the end of its upward movement, substantially as set forth.

In testimony whereof I affix my signature in presence of two witnesses.

FREDERICK EGGE.

Witnesses:
J. S. FINCH.
F. W. SMITH, Jr.